Aug. 29, 1961  G. O'MAHONY  2,998,538
CONTINUOUSLY VARIABLE SPEED DRIVE SYSTEM
Filed March 7, 1960  4 Sheets-Sheet 1

Aug. 29, 1961  G. O'MAHONY  2,998,538
CONTINUOUSLY VARIABLE SPEED DRIVE SYSTEM
Filed March 7, 1960  4 Sheets-Sheet 4

United States Patent Office 2,998,538
Patented Aug. 29, 1961

2,998,538
CONTINUOUSLY VARIABLE SPEED
DRIVE SYSTEM
Gerard O'Mahony, Suresnes, France, assignor to Societe a Responsabilite limitee Auxilec, Auxiliaires Electro-mecaniques de Precision, Colombes, France
Filed Mar. 7, 1960, Ser. No. 13,115
Claims priority, application France Mar. 6, 1959
9 Claims. (Cl. 310—95)

The present invention relates, in a general manner to a continuously variable speed drive system, the input shaft of which rotates at a speed which is susceptible to variation over an extended range of values and the output shaft of which is required to rotate at a constant speed.

More particularly, it relates to a system of the above kind for driving a constant frequency alternator from a variable speed mechanical prime mover, for example with a view to supplying alternating current networks on vehicles such as aeroplanes, locomotives and so on.

In the first place, it will be recalled that, among the various previously known constructions of such systems in which a variable speed input shaft drives an electric current generator at constant speed through the intermediary of a variable ratio transmission device whose transmission ratio is precisely controlled in such a manner that the speed of rotation of the output shaft remains constant, there are those which have used as transmission devices couplings of the variable slip electromagnetic type, the amount of slip being controlled by variation of an electric control current for the electromagnetic coupling.

In the secyond place, it will also be recalled that there are other known devices for the transmission of movement between an input shaft and an output shaft, intended particularly to be used as speed changers, and of the type constituted by a differential gear mechanism interposed between the input shaft and the output shaft, the planet wheels of which are carried by the input shaft while the first sun wheel is rotationally coupled to the output shaft and the second sun wheel is mounted for free rotation while being capable of being subjected to a braking system which can be constituted, in particular, by an electromagnetic brake of the variable slip type whose rotor is rotationally coupled to such second sun wheel and the stator of which is connected to a fixed part of the device.

It is thus seen that these two kinds of movement transmitting device can, if necesary, be used with a view to effecting constant speed drive of an output shaft. However, with these devices, it is to be noted that, while the speed of rotation of the input shaft can be varied between lower and upper limiting values, the value of the transmission ratio of the transmission device must likewise be varied in an inversely proportional manner between respective upper and lower limits, in order to drive the output shaft at a substantially constant speed.

With a movement transmitting device of the variable slip electromagnetic type, it is obvious that the maximum difference between the lower and upper limiting values of the slip which it is possible to use in practice determines the maximum extent of the permissible range of speeds of rotation of the input shaft.

This can be expressed otherwise by saying that, if it is desired to drive an output shaft at constant speed from an input shaft whose speed is variable over a predetermined range of values, a slipping type transmission device should be used which is capable of covering a range of slip values corresponding to the range of transmission ratios, and consequently having a weight and bulk determined by the problem to be resolved and, in certain conditions, operating with considerable losses.

The present invention has the object of eliminating the disadvantage which results from the operational limitation referred to above, such disadvantage being particularly apparent in the case where an alternator is to be driven through a mechanical coupling which is rotated by a motor whose speed of rotation is known to be variable over a very extended range of values.

For this purpose, an electro-mechanical constant speed driving system according to the invention comprises a variable speed input shaft, a differential gear mechanism comprising at least three movable parts constituted respectively by a planet-wheel carrier and two sun wheels each engaging such planet wheels, a first one of such movable parts being in driving connection with said input shaft, a second one of such movable parts being in positive driving connection with said output shaft and the third one of these movable parts being rotationally coupled to a first rotor element of an electromagnetic coupling of the variable slip type and an electric control circuit adapted to regulate the excitation current of said electromagnetic coupling in a manner so as to control the magnitude of the slip in said coupling such that a constant speed of rotation of the output shaft is obtained, and is characterised in that means are provided for effecting the rotation in one sense or the other or for immobilising the second rotor element of said electromagnetic coupling under the control of an auxiliary electric circuit comprising means for measuring the speed of rotation of the input shaft.

According to a particular embodiment of the invention, the planet-wheel carrier of said differential mechanism is rotationally coupled to the input shaft, a first sun wheel of said differential is rotationally coupled to the output shaft, a second sun wheel of the differential is rotationally coupled to the armature of the electromagnetic variable slip coupling and the inductor of this coupling is connected to the input shaft through the intermediary of a movement transmitting device arranged either to rotate said inductor in a direction opposite to that of the input shaft or to immobilise it according to whether the value of the speed of rotation of the input shaft is respectively lower or higher than a predetermined value lying intermediate the limiting values between which the speed fo the input shaft can be varied.

According to a particular construction of the aforementioned movement transmitting device connected to said inductor, the input shaft is arranged to rotate the first sun wheel of a second differential gear mechanism, the axes of the planet-wheels of this second differential mechanism being carried by a plate which can either be immobilised by a brake or be allowed to rotate freely, such brake being operated or freed according to whether the speed of rotation of the input shaft is respectively lower or higher than the afore-mentioned predetermined intermediate value, the second sun wheel of such second differential mechanism being connected to the inductor which is mounted on a fixed part of the electromagnetic driving system through the intermediary of a free-wheel device which permits rotation of such inductor only in the direction opposite to that of the rotation of the input shaft.

An electromagnetic driving system according to the invention has the following essential advantages with respect to known systems: for equal weight and bulk and for given maximum losses in the electromagnetic coupling, an increase is provided in the range of permissible speeds of the input shaft, without increasing the absolute maximum speeds of rotation of the various parts of the electromagnetic coupling. On the other hand, for a given speed range and for given absolute maximum speeds of the parts, a reduction is obtainable in the bulk and weight of the rotating parts employed (electromagnetic coupling, differentials, blocking brake used for immobilising one of the rotors of the coupling); the dimensions of these parts being a function of the couples which they support, and such couples being by reason of the principle of operation lower than in the known systems used at present.

On the other hand, the simplicity and robustness of the variation control means constituted by an electromagnetic coupling largely compensates for the disadvantage of the losses which it produces, particularly in the case where the efficiency of the variation control means is of little importance, for example when the input shaft is connected to a motive power source which is very large with respect to that transmitted by said variation control means. This is the case particularly with a device driven by an aeroplane motor.

In addition, the armature of the coupling can be made of massive iron, in which the losses are readily dissipated; also, the operation of this variation control means at very high temperatures is considerably facilitated, since the theoretical thermal limit is the Curie point of this metal. This property is of great interest for use in supersonic aircraft, since it is possible to cool the variator with air of elevated temperature.

As explained above, the immobilisation of one of the rotors of the electromagnetic coupling is effected with the aid of a blocking brake which is preferably of the electromagnetic type. Whatever may be the particular type of brake used, its operation to active or rest condition is controlled by means of an excitation current.

The present invention also has as its object to control the excitation current of the blocking brake as a function of the power furnished by the output shaft, that is to say for example as a function of the power demanded by the alternator being driven at constant speed by this output shaft. In fact, it is advantageous to reduce the instantaneous peak values of the couples produced on the various parts of the electromagnetic driving system during operation of the blocking brake, since it can be readily conceived that a sudden application of an excitation current to the brake has the risk of creating excessive couple values prejudicial to the useful life of the system.

The following description will enable the invention to be understood. It relates to the accompanying drawings, in which.

Figure 1:
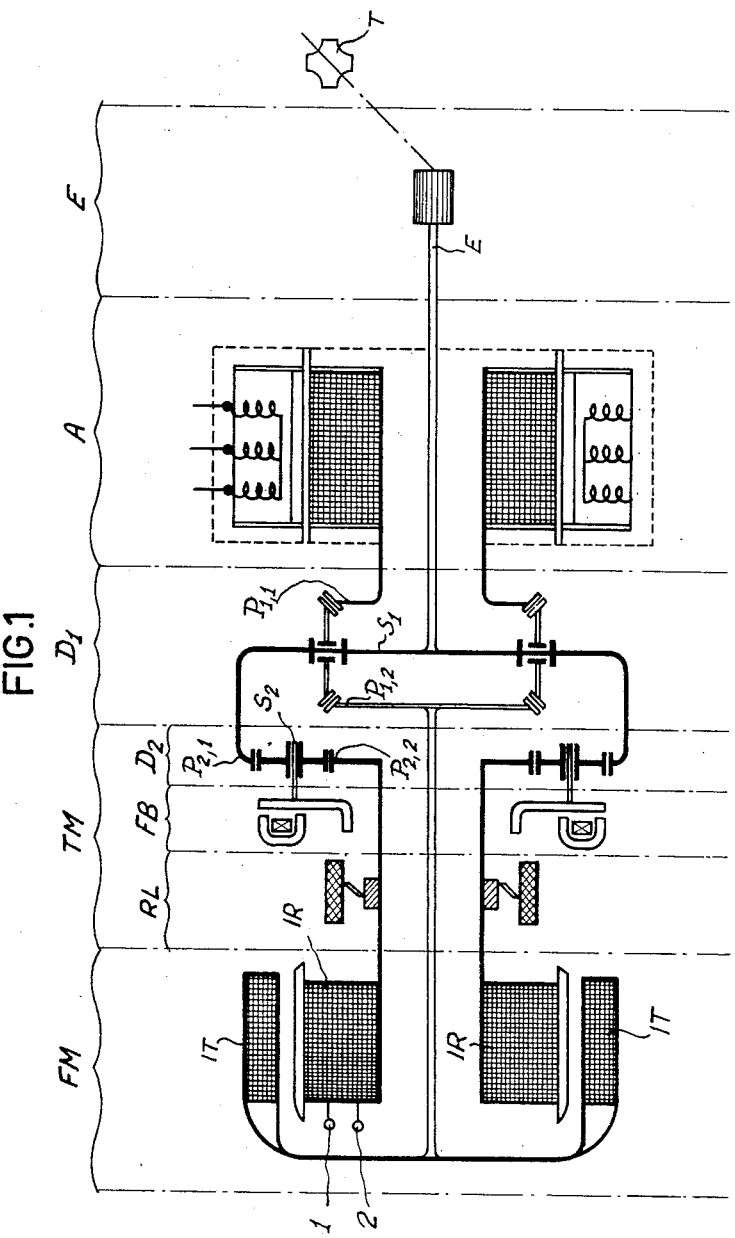
FIG. 1 shows, without the electric control circuits, an electromagnetic driving system according to the invention intended for driving an alternator at constant speed, the electrical and mechanical components being illustrated in a diagrammatic form particularly suited to understanding of the functional operations of the assembly of the system.

With reference to FIG. 1, E indicates an input shaft rotating at a variable speed whose value during operation can lie between a minimum value $N_{e1}$ and a maximum value $N_{e3}$.

The input shaft E is rotationally coupled to a planet-wheel carrier plate $S_1$ of a differential gear mechanism $D_1$ which can be of known type and particularly of the epicyclic type. A first bevel gear $P_{1,1}$ of this differential $D_1$, hereinafter referred to as the "sun wheel $P_{1,1}$," is connected to and drives an alternator A with a speed of rotation $N_a$ which is maintained constant, as will be explained later.

A second bevel gear $P_{1,2}$ of the differential $D_1$, hereinafter referred to as the "sun wheel $P_{1,2}$," is rotationally coupled to the armature IT of a Foucault or eddy current electromagnetic coupling hereinafter referred to as the "brake motor FM," the inductor IR of which is excited by direct current supplied through the terminals 1, 2 constituted by slip rings.

The armature IT of the brake motor FM is preferably of massive form and made of magnetic steel.

The known advantage of this brake motor device is the provision of a braking couple which is substantially independent of the relative speed between the armature and the inductor (i.e., the slip speed) beyond a minimum speed for a given value of excitation current. It is thus possible to accommodate variation of the input speed over ranges which are considerable in size while maintaining the output speed to the alternator constant, as will be better understood from the following.

It may be advantageous to reduce the electric resistance of the armature to reduce the minimum slip speed value by incorporating therein bars of brass or aluminium in the well known squirrel cage form or as annuli.

This armature is also provided with cooling vanes, either cut into the main body thereof or connected to it, when it is desired to effect cooling by means of blown air.

The inductor IR is connected to the input shaft E by a movement transmission device TM capable either of driving it in a single direction converse to that of the shaft E or of being held stationary.

The transmission device TM comprises the following three components for this purpose: a free-wheel RL of any suitable known type interposed between the inductor IR and a fixed body part and arranged to permit rotation of the inductor IR only in the direction opposite to that of the input shaft E; a differential gear device $D_2$ of known type of which the pinions of the planet-wheel carrier $S_2$ engage on the one hand with a first gear wheel, called the sun wheel $P_{2,1}$, rotationally connected to the input shaft E and on the other hand with a second gear wheel, called the sun wheel $P_{2,2}$, rotationally connected to the inductor IR; a blocking brake FB capable either of holding the planet-wheel carrier $S_2$ stationary or of allowing it to rotate freely. This blocking brake is preferably of the electromagnetic type. Its friction surface can be in the form of a single disc, multiple discs, or cones. It is also possible to use a band type brake of the electrically controlled kind.

The system also comprises a tachiometric device shown diagrammatically at T, FIG. 1. This device T measures the speed of rotation $N_e$ of the driving shaft E and, through the intermediary of appropriate circuits such as those described below, controls the actuation and release of the blocking brake FB.

The operation of the device described above consists essentially of two successive phases according to whether the speed $N_e$ of the input shaft E is between its minimum value $N_{e1}$ and an intermediate value $N_{e2}$ and when the blocking brake FB is in action or whether the speed $N_e$ of the input shaft E is between such intermediate value $N_{e2}$ and the maximum value $N_{e3}$ and when the blocking brake FB is out of use. These two cases can be analysed successively as follows:

(a) The blocking brake FB of the planet-wheel carrier $S_2$ of the differential $D_2$ is actuated (in the case of low speed of the input shaft E).

In this case, the planet-wheel carrier $S_2$ of the differential $D_2$ is held stationary. The planet-wheel $P_{2,2}$ connected to the inductor IR of the motor brake FM then rotates in converse direction to the input shaft E (as is permitted by the provision of the free-wheel RL) and at a speed proportional to the speed of rotation $N_e$ of such input shaft. It is thus possible to rotate the armature IT of the brake motor FM in the inverse direction to that of the input shaft E.

Under these conditions, to maintain the speed of the alternator (and thus its frequency) constant, the speed of the armature IT of the brake motor FM is varied in dependence upon the driving shaft speed $N_e$, the actual speed being a function of the gearing ratios of the differential $D_1$. This is realised as shown below with reference to FIG. 2.

The alternator A is thus rotated at the start by the input shaft E through the intermediary of the differential gear $D_1$ operating as a variable output mechanical multiplying transmission device. It is thus possible to have a very low value of minimum permissible speed of rotation of the input shaft E necessary to drive the alternator A at the desired speed $N_a$.

(b) The blocking brake FB of the planet-wheel carrier $S_2$ of the differential $D_2$ is not actuated (in the case of higher speeds of the input shaft E).

In this case, the sun wheel $P_{1,1}$ connected to the alternator A exerts a couple on the planet-wheel carrer $S_1$ of the differential $D_1$ which is balanced by the opposing couple transmitted by the planet wheel $P_{1,2}$ connected to the armature IT of the brake motor FM. The reaction couple corresponding to the inductor IR of the brake motor FM is taken by the free-wheel RL which thus assumes its blocked position. The inductor IR of the brake motor FM is thus held stationary and the planet-wheel carrier $S_2$ of the differential $D_2$ thus rotates idly.

The armature IT rotates in the same direction as the input shaft E which thus drives the alternator A through the intermediary of the differential $D_1$ which operates as a variable speed mechanical transmission device (according to the value of slip in the brake motor FM).

It will be noted that for a given alternator speed $N_a$ there is a minimum speed $N_{e2}$ of the driving shaft for which the rotational speed of the armature of the brake motor is zero. Below this theoretical speed $N_{e2}$, it will thus not be possible to maintain the speed of the alternator constant (in practice, it is necessary to take account of the minimum slip speed of the brake motor) if there is no possibility of inverting the sense of rotation of the armature IT as explained above at (a).

In the table below, the theoretical characteristics of operation of the various parts of the device are shown grouped in the two operating phases:

| | Speed $N_e$ of the input shaft | Speed of the inductor IR of the brake motor FM | Speed of the armature IT of the brake motor FM | Speed $N_a$ of the alternator | Speed of the planet-wheel carrier $S_2$ of the differential $D_2$ |
|---|---|---|---|---|---|
| (a) Blocking brake FB of differential $D_2$ excited—"Free wheel" RL allowing inductor to turn. | 0 | 0 | 0 | 0 | 0 |
| | Minimum speed $N_{e1}$ | $-\lambda.N_{e1}$ | $-\lambda.N_{e1}$ | $N_a$ | 0 |
| | Maximum speed $N_{e2}$ | $-\lambda.N_{e2}$ | 0 | $N_a$ | 0 |
| (b) Blocking brake FB of differential $D_2$ de-energised—"Free wheel" RL blocked. | Minimum speed $N_{e2}$ | 0 | 0 | $N_a$ | $\lambda'.N_{e2}$ |
| | Maximum speed $N_{e3}$ | 0 | $+k.N_{e3}$ | $N_a$ | $\lambda'.N_{e3}$ |

In this table:

The sign + denotes the sense of rotation which is that of the input shaft E,

The sign — denotes the converse sense of rotation, $\lambda$ is the transmission ratio of the differential $D_2$ with the blocking brake FB excited, $\lambda'$ is the transmission ratio of the differential $D_2$ when the blocking brake FB is de-energised, $k$ is the transmission ratio of the differential $D_1$.

The transition from the operation (a) to the operation (b) (or vice versa) is effected by measuring the input speed $N_e$ by means of the tachiometric element T and by de-energising (or exciting) the blocking brake FB of the differential $D_2$ when this speed is higher (or lower) than the value $N_{e2}+n$, $n$ being a speed related to the minimum slip speed of the brake motor FM.

Figure 2:
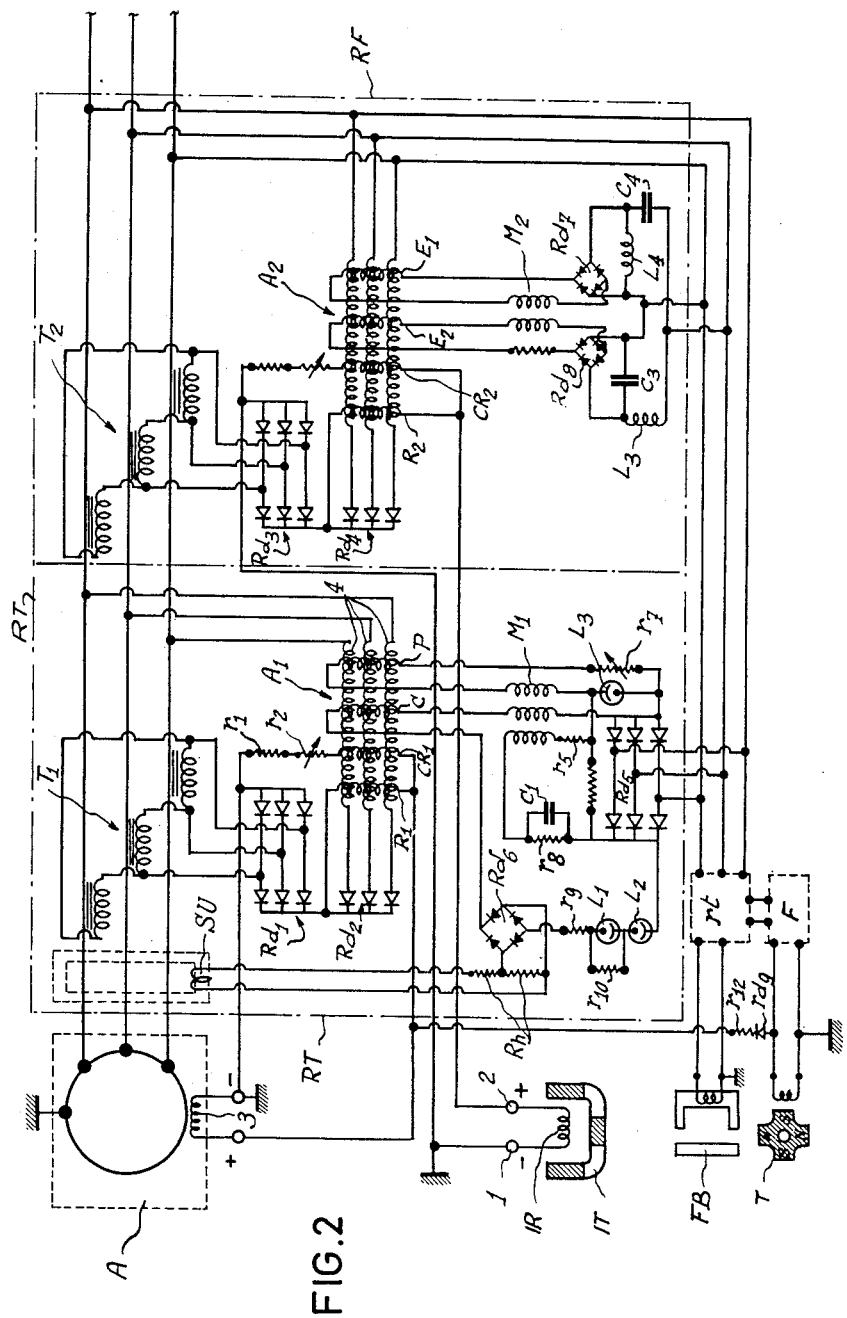
FIG. 2 is a diagram of the electrical components and circuits associated with the system of FIG. 1.

Reference is now made to FIG. 2 for the following description of the electric circuits associated with the device for driving the constant frequency alternator of FIG. 1. These circuits are essentially constituted by a voltage regulator circuit (shown within the chain-dotted framework with the reference RT), a frequency regulator circuit (framework RF) and a tachiometric relay $rt$ permitting passage from the function (a) to the function (b) as explained above.

The voltage regulator circuit RT includes a three-phase power intensity transformer $T_1$ which is connected to the three output lines of the alternator A and feeding, across the rectifiers $R_{d1}$ in series with a reaction winding $R_1$ of a magnetic amplifier $A_1$, the field winding 3 of the alternator A. The transformer $T_1$ thus provides an important part of the excitation current of the alternator A.

The regulated component of the excitation current is furnished through the intermediary of the auto-saturation three-phase magnetic amplifier $A_1$ referred to above. The source of the voltage to be regulated, that is the output of the alternator A, itself constitutes an alternative source of substantially constant voltage for supplying power to the magnetic amplifier $A_1$ of which the output current supplies the alternator winding 3 via the reaction winding $R_1$.

The amplifier $A_1$ comprises three windings 4 shown connected in series with the input source and wound on saturable magnetic cores. The voltage appearing at the terminals of these windings 4 is a function of the state of saturation of such magnetic cores. Thus, by varying this saturation state as a function of the value of the output voltage of the alternator, a continuous current can be obtained after rectification which itself varies as a function of this voltage.

As has been said, the characteristic curve of a magnetic amplifier representing as a function of the saturation ampere turns a mean value for the output current includes a substantially linear used part which defines a gain which it is advantageous to make as high as possible so as to provide a highly sensitive installation. This modification of the gain is obtained in the first place by a supplementary saturation proportional to the output current I of the amplifier $A_1$ and obtained by means of the above-mentioned reaction winding $R_1$ and in the second place by a de-saturation proportional to the output voltage of the amplifier $A_1$, and thus to the output current, and obtained by means of a second reaction winding $CR_1$.

The effect of this de-saturation is readily variable by means of an adjustable resistance $r_2$ connected in series with a resistance $r_1$. This winding $CR_1$ permits adjustment of the precision of regulation.

It is desirable to choose on the modified characteristic curve of the magnetic amplifier $A_1$ a correct operating point such that for the nominal voltage of the alternator A the output current of the amplifier $A_1$ has a suitable value.

This is readily attained by the choice of a certain number of control ampere turns given by a winding C. However, it is convenient to use to the maximum all the rectilinear part of the characteristic curve with control currents of the same sense. In the application described, it is desirable for the output current of the amplifier $A_1$ to decrease when the voltage of the alternator A increases, which, as a function of the voltage detector chosen, leads to control ampere turns which are always negative.

The whole of the characteristic curve is thus shifted in such a manner that, for negative control ampere turns, all the rectilinear region is used. This shifting is obtained by a constant current passing through a polarisation winding P creating a suitable number of ampere turns. This current is obtained through an adjustable resistance $r_7$ from the constant voltage which exists at the terminals of a reference tube $L_3$.

Finally, it is by means of the ampere turns created in the control winding C that regulation of the voltage can be effected. The necessary current for these ampere turns is obtained from the voltage to be regulated by way of the rectifiers $R_{d5}$ which give the mean value of this voltage. The voltage continuously proportional to the alternating input voltage is opposed to the voltage of the two neon regulating tubes $L_1$ and $L_2$ mounted in series. The resultant voltage creates in the control winding C a current determined by the adjustable resistance $r_9$ permitting the choice of the desired point of operation. As is well known, a resistance $r_{10}$ inserted in the control circuit ensures certain striking of the neon tubes $L_1$ and $L_2$.

Magnetic amplifiers, when in operation, induce electromotive forces in the control windings (harmonics). These harmonics disturb the operation by making the detectors less sensitive or even insensitive, according to their actual value. To avoid this effect, a self-inductance is often introduced in series in the windings. In the regulator circuit described, this function is supplied by a transformer $M_1$ in order to present, apart from the inherent self-inductive effect of each winding, the effect of mutual inductance in the other winding. The proportion of the harmonics passing through the windings is thus made exceptionally low.

A magnetic device SU—$R_h$—$R_{d6}$ permits, when necessary, limitation of the high voltage arising in the case of unbalance between phase and neutral.

A circuit $r_8$—$C_1$—$r_5$— winding of the transformer $M_1$, serves to complete the stabilisation.

The frequency regulator circuit RF comprises a power intensity transformer $T_2$ providing a considerable part of the excitation of the inductor IR of the Foucault or eddy current brake connected across the rectifiers $R_{d3}$. It is necessary, in effect, to increase the excitation of the brake as the current supplied by the alternator increases.

Finally, an auto-saturation three-phase magnetic amplifier $A_2$ is fed through the rectifiers $R_{d4}$ arranged in parallel with the rectifiers $R_{d3}$ and furnishes the necessary complement of the excitation current. This amplifier includes four control windings. The first two windings $R_2$ and $CR_2$ are the reaction windings, one $R_2$ being in series with the brake excitation current and the other $CR_2$ being connected across the excitation voltage. The two other windings $E_1$ and $E_2$ are symmetrical windings arranged in opposition and are supplied by way of rectifiers through two filters, one, $L_4$, $C_4$, being a high pass fiter and the other, $L_3$, $C_3$, being a low pass fiter relative to the output frequency of the alternator A.

The coupled windings $M_2$ are intended for the stabilisation of the system.

The tachiometric relay rt is controlled by a permanent magnet inductor type alternator T supplying through a filter F. The relay rt can be of a magnetic, mechanical or control cell type. This relay energises or de-energises the blocking brake assembly FB as a function of the input sped, so as to cause a change of speed as already described above.

It is noted finally that a circuit $R_{d9}$—$R_{12}$ is provided from the tachiometric alternator T to the field winding 3 and serves to provide current for starting up the alternator A.

With reference to FIG. 2, it has been mentioned that the blocking brake FB is either fully operated or not at all in accordance with the value of the speed of the input shaft.

As mentioned above, it is advantageous to provide with an electric control circuit the blocking brake FB permitting adjustment of the amplitude of the excitation current.

Figure 3:
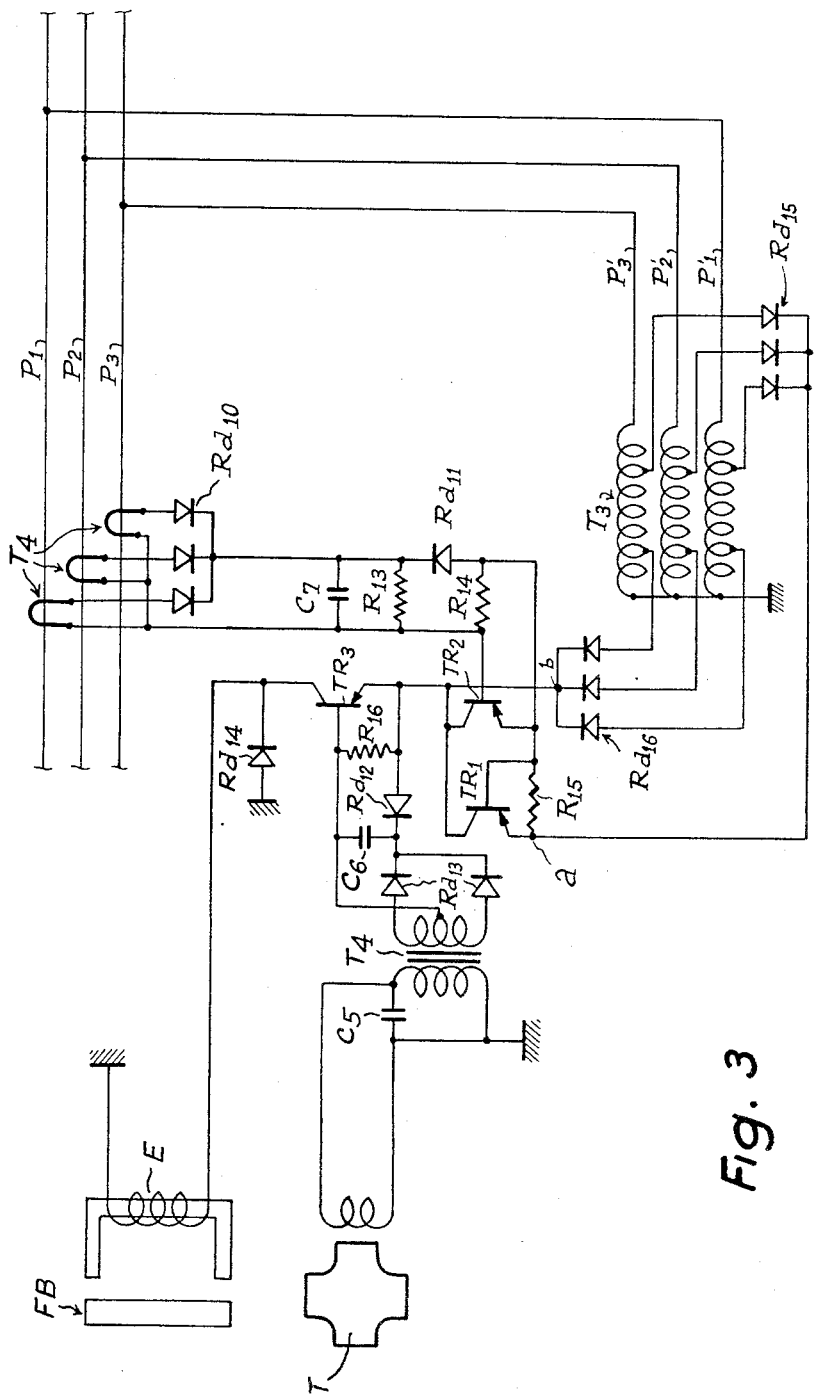
FIGS. 3 and 4 are two different types of electric circuit which may be used for controlling the blocking brake mentioned above.

Referring now to FIG. 3, a first embodiment of such electric control circuit will be described.

The three-phase conductors $P_1$, $P_2$, $P_3$ are connected to the alternator A of FIGS. 1 and 2 and three other phase conductors $P'_1$, $P'_2$, $P'_3$ are connected in parallel to the conductors $P_1$, $P_2$, $P_3$.

A three-phase auto-transformer $T_3$ having each winding double tapped and supplied by the conductors $P'_1$, $P'_2$ and $P'_3$ supplies via two rectifier bridges $R_{d15}$ and $R_{d16}$ the voltages $U_a$ and $U_b$ to the points a and b, the voltage $U_a$ at point a being higher than the voltage $U_b$ at point b.

Normally, for low output by the alternator and when the speed of the input shaft is below the value $N_{e2}$, the transistor $TR_3$ is unblocked, the transistors $TR_1$ and $TR_2$ are blocked, and the electromagnet E of the blocking brake FB is supplied with the voltage $U_b$.

For the same input shaft speeds, when the power take-off of the alternator passes a predetermined value, the transistor $TR_1$ is unblocked through the intermediary of the transistor $TR_2$ and the electromagnet E is then supplied with the voltage $U_a$.

Finally, when the speed of the input shaft is above the value $N_{e2}$, the transistor $TR_3$ is blocked and the electromagnet E is no longer energised.

The control of the transistor $TR_3$ is effected by way of the following circuit: tachiometric alternator T, condenser $C_5$, transformer $T_4$, rectifiers $R_{d13}$, condenser $C_6$, rectifier $R_{d12}$ and resistance $R_{16}$. The output voltage delivered by the rectifiers $R_{d13}$ is a function of the voltage delivered by the tachiometric alternator T, that is to say, a function of the speed of the input shaft. For the range of variations envisaged for the speed of the input shaft, the filter consiituted by the condenser $C_5$ and the associated winding of the transformer $T_4$ is so arranged that an increase of the speed results in a reduction of the voltage delivered to the terminals of the condenser $C_6$. When this voltage passes the value of the inverse voltage of the rectifier $R_{d12}$, which is a Zener type diode, a current circulates in the resistance $R_{16}$ which results in unblocking of the transistor $TR_3$. The rectifier $R_{d14}$ is connected in parallel with the winding E to avoid the application of excessive voltage to the transistor $TR_3$ at the moment of blocking thereof. The control of the transistor $TR_1$ is ensured by the resistance $R_{15}$ and the transistor $TR_2$ which is itself controlled by the resistance $R_{14}$ and the following circuit: current transformer $T_4$, which is fed from the conductors $P_1$, $P_2$ and $P_3$, rectifiers $R_{d10}$, condenser $C_6$, resistance $R_{13}$, and rectifier $R_{d11}$, which is a Zener type diode. When the current supplied by the alternator attains a predetermined value, the voltage at the terminals of the resistance $R_{13}$ which is created by the current circulating through the current transformer $T_4$, the diodes $R_{d10}$ and the resistace $R_{13}$ reaches the value of the inverse voltage of the Zener diode $R_{d11}$ and then produces a voltage at the terminals of the resistance $R_{14}$ which unblocks the transistor $TR_2$, which then itself unblocks the transistor $TR_1$ through the intermediary of the resistance $R_{15}$.

With a control circuit such as that described above with reference to FIG. 3, control of the excitation current for the blocking brake FB is thus realised with the aid of one or other of the two different values of the voltage $U_a$ and $U_b$ as a function of the load on the alternator.

Figure 4:
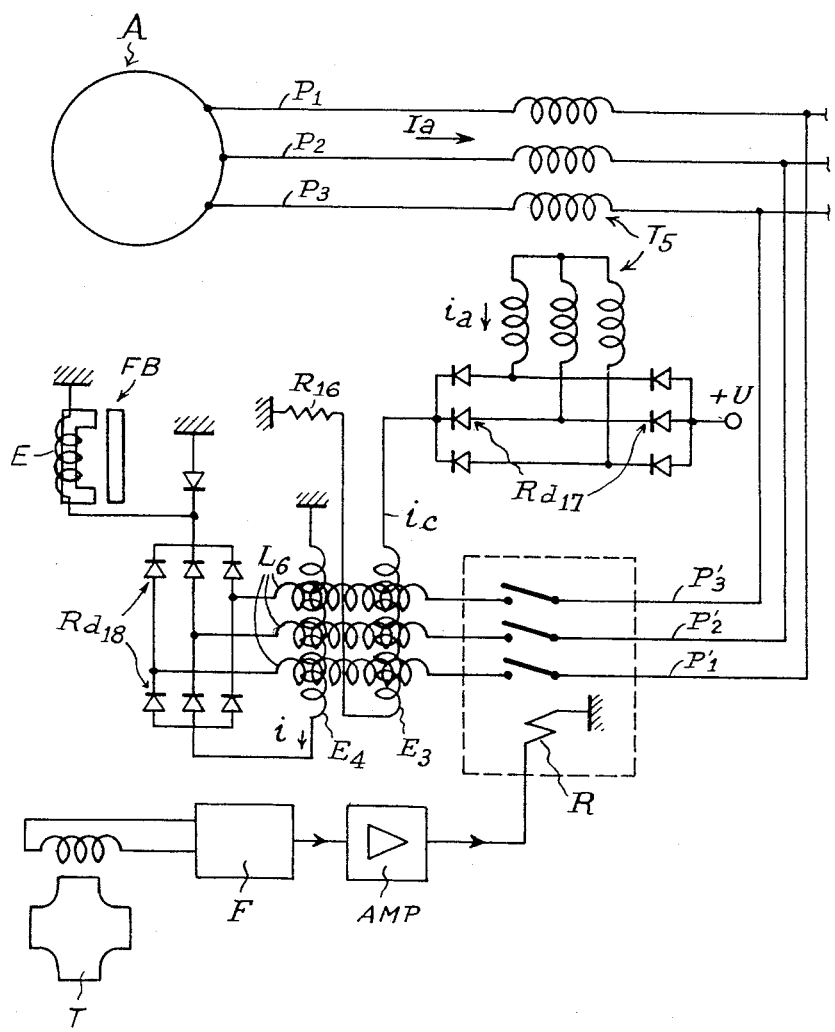

Reference is now made to FIG. 4, which shows an electric circuit of a second possible type for control of the excitation current for the blocking brake FB.

According to this modification, the amplitude of the excitation current in the blocking brake FB is held at a constant value while the amplitude of the current supplied by the alternator remains below a certain predetermined value, then has a progressively increasing value when the amplitude of the current supplied by the alternator is above this predetermined value.

For this purpose, the control electromagnet E of the blocking brake FB is supplied, through the rectifiers $R_{d18}$ and a self-saturable three-phase inductance $L_6$ with the voltage of the alternator A taken by the conductors $P'_1$, $P'_2$, $P'_3$ connected in parallel to the conductors $P_1$, $P_2$ and $P_3$ through the intermediary of the contacts of a relay R controlled by the tachiometer T. The self-saturable inductor $L_6$ is controlled by a winding $E_3$ which is supplied with a current $i_c$ and by a winding $E_4$ arranged in opposition and supplied with the current $i$ circulating in the control electromagnet E of the brake FB. This self inductor $L_6$ is such that if the magnetisation ampere turns are neglected, the current $i$ is proportional to the current $i_c$.

If the following circuit is now considered; source of supply $+U$, rectifiers $R_{d17}$, current transformer $T_5$, winding $E_3$ and resistance $R_{16}$, and the case where the amplitude of the current $I_a$ supplied by the alternator is nil, the amplitude of the current $i_a$ supplied by the secondary of the current transformer $T_5$ is nil and the current $i_c$, which is due to the voltage source $+U$ passes through the diodes $R_{d17}$, the winding $E_3$ and the resistance $R_{16}$.

Between this zero value and a predetermined amplitude value of the alternator output current $I_a$, the value of the current $i_c$ remains unchanged, the secondary currents $i_a$ being able to circulate through the diodes $R_{d17}$. Beyond this predetermined amplitude value of the current $I_a$, the secondary current $i_a$ rises above such value and the intensity of the current $i_c$ then increases with that of the current $I_a$. The amplitude of the current $i$ changes in similar manner and follows the variations of the amplitude of the current $i_c$ when the relay R is closed.

The nature of the relay R, the amplifier AMP and the filter F is immaterial, this assembly being arranged merely to cause energisation of the blocking brake FB for a predetermined value $N_{e2}$ of the speed of the input shaft.

The last control circuit has the advantage of providing a couple at the blocking brake which is proportional to the load on the alternator and which is independent of the temperature of the winding of the blocking brake.

In the above description and in the drawings, certain embodiments and certain diagrams for the electric circuits have been explained by way of example.

It should be understood however that the invention is not limited to these embodiments and can be carried out in other ways and for other purposes.

Furthermore, the invention has been described as applied in the case where the object is that of driving an output shaft at a constant speed, since this is a problem which is frequently met with. However, it will readily be understood that an electromagnetic driving system according to the invention can also be arranged to effect the driving of an output shaft according to a law providing variation of the speed of rotation of this output shaft. It is sufficient for such an application appropriately to redesign the electric circuit supplying the continuous current which controls the value of the slip in the electromagnetic coupling.

For example, in order to explain the above, the use of an electromagnetic driving system such as described above on board an aeroplane provided wth a motor can be envisaged. Normally, the system drives a constant frequency alternator at constant speed. But for starting the motor of the aeroplane, a different system can be used, the alternator then being supplied with a current from an external electric power source and, functioning as an asynchronous motor, operates to rotate the motor of the aeroplane at a progressively increasing speed, through the intermediary of the electromechanical driving system, until starting of this motor is effected.

Also, in the case of the example according to FIG. 1, it has been indicated that the armature IT of the brake motor FM is rotated by the sun wheel $P_{1,2}$ of the differential $D_1$. This could obviously also be the inductor of the electromagnetic coupling.

As regards the use of the differential $D_1$, it may also be mentioned that the input shaft E can actuate any other movable part of the differential, such as the planet-wheel carrier $S_1$. It can be seen that it is necessary then to calculate the transmission ratios of the differential gears and to determine, in each different possible use of the movable parts of the differential, the sense of rotation to be imparted to such different parts.

I claim:

1. An electromechanical constant speed driving system comprising a variable speed input shaft, a constant speed output shaft, a differential gear mechanism including at least three movable parts constituted respectively by a planet wheel and carrier system and first and second sun wheels each in meshing engagement with the planet wheels of said carrier system, a first one of said movable parts being in driving connection with said input shaft, a second one of said movable parts being in driving connection with said output shaft, an electromagnetic variable slip coupling including first and second rotor elements, said first rotor element being rotationally coupled to the third one of said movable parts of said differential gear mechanism, a main electric control circuit supplying excitation current to said electromagnetic coupling so to control the magnitude of slip in said coupling that a constant speed of rotation of said output shaft is obtained with different speeds of rotation of said input shaft, means for effecting the rotation of said second rotor element of said electromagnetic coupling in one direction or the other, electrically controlled brake means for immobilising said second rotor element rotating means and an auxiliary electric control circuit including tachometric means for measuring the speed of rotation of said input shaft, said auxiliary electric control circuit controlling said brake means.

2. An electromechanical constant speed driving system comprising a variable speed input shaft, a constant speed output shaft, a differential gear mechanism including a planet wheel and carrier system and first and second sun wheels, said planet wheel and carrier system being rotationally coupled to said input shaft, said first sun wheel being rotationally coupled to said output shaft, an electromagnetic variable slip coupling having an inductor and an armature, said second sun wheel being rotationally coupled to said armature, a movement transmitting device connected between said inductor and said input shaft and arranged to rotate said inductor in a direction opposite to that of said input shaft, electrically controlled brake means for immobilising said motion transmitting device, a main electric control circuit supplying excitation current to said inductor so to control the magnitude of slip in said electromagnetic slip coupling that said output shaft is rotated at constant speed with different speeds of rotation of said input shaft within a predetermined range of speeds, an auxiliary electric control circuit including tachometric means for measuring the speed of rotation of said input shaft, said auxiliary electric control circuit being connected to control said brake means to immobilise said motion transmitting device when the speed of rotation of said input shaft is higher than a predetermined intermediate value in said predetermined range of input speeds and to free said motion transmitting device when the speed of rotation of said input shaft is lower than said predetermined intermediate value.

3. An electromechanical constant speed driving system comprising a variable speed input shaft, a constant speed output shaft, a first differential gear mechanism including a planet wheel and carrier system and first and second sun wheels, said planet wheel and carrier system being rotationally coupled to said input shaft, said first sun wheel being rotationally coupled to said output shaft, an electromagnetic variable slip coupling having an inductor and an armature, said second sun wheel being rotationally coupled to said armature, a second differential gear mechanism including a planetary gear system and first and second sun wheels, said first sun wheel of said second differential gear mechanism being arranged for rotation by said input shaft, said second sun wheel of said second differential gear mechanism being rotationally connected to said inductor and said planetary system of said second differential gear mechanism being connected to an electrically controlled brake device for arresting said planetary system, a free-wheel device interconnecting said inductor with a stationary part of the driving system to permit rotation of said inductor only in a direction opposite to the direction of rotation of said input shaft, a main electric control circuit supplying excitation current to said inductor so to control the magnitude of slip in said electromagnetic coupling that said output shaft is rotated at constant speed with different speeds of said input shaft within a predetermined range of permissible input speeds, an auxiliary electric control circuit including tachometric means for measuring the speed of rotation of said input shaft, said auxiliary electric control circuit being connected to control said brake means to arrest said planetary system when the speed of rotation of said input shaft is lower than a predetermined intermediate value in said range of permissible input speed values and to free planetary system when the speed of rotation of said input shaft is higher than said predetermined intermediate value.

4. An electromechanical constant speed driving system comprising a variable speed input shaft, a constant speed output shaft, a differential gear mechanism including at least three movable parts constituted respectively by a planet wheel and carrier system and first and second sun wheels each in meshing engagement with the planet wheels of said carrier system, a first one of said movable parts being in driving connection with said input shaft, a second one of said movable parts being in driving connection with said output shaft, an elecromagnetic variable slip coupling including first and second rotor elements, said first rotor element being rotationally coupled to the third one of said movable parts of said differential gear mechanism, a main electric control circuit supplying excitation current to said electromagnetic coupling so to control the magnitude of slip in said coupling that a constant speed of rotation of said output shaft is obtained with different speeds of rotation of said input shaft, means for effecting the rotation of said second rotor element of said electromagnetic coupling in one direction or the other, elecrically controlled brake means for immobilising said second rotor element rotating means and an auxiliary electric control circuit including tachometric means for measuring the speed of rotation of said input shaft and means for determining the power delivered by said output shaft, said auxiliary electric control circuit supplying to operate said brake means an excitation current whose amplitude is one of a plurality of different values proportional to the power delivered by said output shaft when the speed of rotation of said input shaft is within a first part of the range of operational speeds of said input shaft and withholding excitation current to release said brake means when the speed of rotation of said input shaft is within a second part of said range of operational speeds.

5. An electromechanical constant speed driving system comprising a variable speed input shaft, a constant speed output shaft, a differential gear mechanism including a planet wheel and carrier system and first and second sun wheels, said planet wheel and carrier system being rotationally coupled to said input shaft, said first sun wheel being rotationally coupled to said output shaft, an electromagnetic variable slip coupling having an inductor and an armature, said second sun wheel being rotationally coupled to said armature, a movement transmitting device connected between said inductor and said input shaft and arranged to rotate said inductor in a direction opposite to that of said input shaft, electrically controlled brake means for immobilising said motion transmitting device, a main electric control circuit supplying excitation current to said inductor so to control the magnitude of slip in said electromagnetic slip coupling that said output shaft is rotated at constant speed with different speeds of rotation of said input shaft within a predetermined range of speeds, an auxiliary electric control circuit including tachometric means for measuring the speed of rotation of said input shaft and means for determining the power delivered by said output shaft, said auxiliary electric control circuit supplying to operate said brake means so as to free said motion transmitting deivce an excitation current whose amplitude is one of a plurality of different values proportional to the power delivered by said output shaft when the speed of rotation of said input shaft is lower than a predetermined intermediate value in said predetermined range of input speeds and to withholding excitation current from said brake means to immobilise said motion transmitting device when the speed of rotation of said input shaft is higher than said predetermined intermediate value.

6. An electromechanical constant speed driving system comprising a variable speed input shaft, a constant speed output shaft, a first differential gear mechanism including a planet wheel and carrier system and first and second sun wheels, said planet wheel and carrier system being rotationally coupled to said input shaft, said first sun wheel being rotationally coupled to said output shaft, an electromagnetic variable slip coupling having an inductor and an armature, said second sun wheel being rotationally coupled to said armature, a second differential gear mechanism including a planetary gear system and first and second sun wheels, said first sun wheel of said second differential gear mechanism being arranged for rotation by said input shaft, said second sun wheel of said second differential gear mechanism being rotationally connected to said inductor and said planetary system of said second differential gear mechanism being connected to an electrically controlled brake device for arresting said planetary system, a free-wheel device interconnecting said inductor with a stationary part of the driving system to permit rotation of said inductor only in a direction opposite to the direction of rotation of said input shaft, a main electric control circuit supplying excitation current to said inductor so to control the magnitude of slip in said electromagnetic slip coupling that said output shaft is rotated at constant speed with different speeds of said input shaft within a predetermined range of permissible input speeds, an auxiliary electric control circuit including tachometric means for measuring the speed of rotation of said input shaft, and means for determining the power delivered by said output shaft, said auxiliary electric control circuit supplying to operate said brake means to arrest said planetary system an excitation current whose amplitude is one of a plurality of different values proportional to the power delivered by said output shaft when the speed of rotation of said input shaft is lower than a predetermined intermediate value in said range of permissible input speed values and withholding excitation current to release said brake means so as to free said planetary system when the speed of rotation of said input shaft is higher than said predetermined intermediate value.

7. An electromechanical constant speed driving system comprising a variable speed input shaft, a constant speed output shaft, a differential gear mechanism including at least three movable parts constituted respectively by a planet wheel and carrier system and first and second sun wheels each in meshing engagement with the planet wheels of said carrier system, a first one of said movable parts being in driving connection with said input shaft, a second one of said movable parts being in driving connection with said output shaft, an electromagnetic variable slip coupling including first and second rotor elements, said first rotor element being rotationally coupled to the third one of said movable parts of said differential gear mechanism, a main electric control circuit supplying excitation current to said electromagnetic coupling so to control the magnitude of slip in said coupling that a constant speed of rotation of said output shaft is obtained with different speeds of rotation of said input shaft, means for effecting the rotation of said second rotor element of said electromagnetic coupling in one direction or the other, electrically controlled brake means for immobilising said second rotor element rotating means and an auxiliary electric control circuit including tachometric means for measuring the speed of rotation of said input shaft and means for determining the power delivered by said output shaft, said auxiliary electric control circuit controlling said brake means by the supply thereto of an excitation current whose amplitude is dependent upon the input shaft speed and output shaft power and which is constant while the power delivered by said output shaft remains below a predetermined value and whose value continuously increases when the power delivered by said output shaft similarly rises above said predetermined value for input shaft speeds within a predetermined range and which is of zero value when the input shaft speed is within a speed range different from said predetermined range.

8. An electromechanical constant speed driving system comprisiing a variable speed input shaft, a constant speed output shaft, a differential gear mechanism including a planet wheel and carrier system and first and second sun wheel, said planet wheel and carrier system being rotationally coupled to said input shaft, said first sun wheel being rotationally coupled to said output shaft, an electromagnetic variable slip coupling having an inductor and an armature, said second sun wheel being rotationally coupled to said armature, a movement transmitting device connected between said inductor and said input shaft and arranged to rotate said inductor in a direction opposite to that of said input shaft, electrically controlled brake means for immobilising said motion transmitting device, a main electric control circuit excitation current to said inductor so to control the magnitude of slip in said electromagnetic slip coupling that said output shaft is rotated at constant speed with different speeds of rotation of said input shaft within a predetermined range of speeds, an auxiliary electric control circuit including tachometric means for measuring the speed of rotation of said input shaft and means for determining the power delivered by said output shaft, said auxiliary electric control circuit being connected to withhold current from said brake means to immobilise said motion transmitting device when the speed of rotation of said input shaft is higher than a predetermined intermediate value in said predetermined range of input speeds and to operate said brake means to free said motion transmitting device when the speed of rotation of said input shaft is lower than said predetermined intermediate value by means of an excitation current whose amplitude has a constant minimum value while the power output from said output shaft remains below a predetermined value and which has a continuously increasing value as the power output from said output shaft rises above said predetermined value.

9. An electromechanical constant speed driving system comprising a variable speed input shaft, a constant speed output shaft, a first differential gear mechanism including a planet wheel and carrier system and first and second sun wheels, said planet wheel and carrier system being rotationally coupled to said input shaft, said first sun wheel being rotationally coupled to said output shaft, an electromagnetic variable slip coupling having an inductor and an armature, said second sun wheel being rotationally coupled to said armature, a second differential gear mechanism including a planetary gear system and first and second sun wheels, said first sun wheel of said second differential gear mechanism being arranged for rotation by said input shaft, said second sun wheel of said second differential gear mechanism being rotationally connected to said inductor and said planetary system of said second differential gear mechanism being connected to an electrically controlled brake device for arresting said planetary system, a free-wheel device inter-connecting said inductor with a stationary part of the driving system to permit rotation of said inductor only in a direction opposite to the direction of rotation of said input shaft, a main electric control circuit supplying excitation current to said inductor so to control the magnitude of slip in said electromagnetic slip coupling that said output shaft is rotated at constant speed with different speeds of said input shaft within a predetermined range of permissible input speeds, an auxiliary electric control circuit including tachometric means for measuring the speed of rotation of said input shaft, and means for determining the power delivered by said output shaft, said auxiliary electric control circuit being connected to control said brake means to hold said planetary system stationary when the speed of rotation of said input shaft is higher than a predetermined intermediate value in said range of permissible input speed values by the supply to said brake means of an excitation current whose amplitude has a constant minimum value while the power output from said output shaft is below a predetermined value and which has a continuously increasing value as the power output from said output shaft rises above the said predetermined value and to free said planetary system by withholding excitation current from said brake means when the speed of rotation of said input shaft is lower than said predetermined intermediate value.

No references cited.